(12) United States Patent
Peng

(10) Patent No.: US 9,753,597 B2
(45) Date of Patent: Sep. 5, 2017

(54) MUTUAL CAPACITANCE SENSING ARRAY

(71) Applicant: Cypress Semiconductor Corporation, San Jose, CA (US)

(72) Inventor: Tao Peng, Starkville, MS (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/830,624

(22) Filed: Aug. 19, 2015

(65) Prior Publication Data

US 2015/0355755 A1 Dec. 10, 2015

Related U.S. Application Data

(63) Continuation-in-part of application No. 12/842,338, filed on Jul. 23, 2010, now abandoned.

(60) Provisional application No. 61/228,476, filed on Jul. 24, 2009.

(51) Int. Cl.
  *G06F 3/041* (2006.01)
  *G06F 3/044* (2006.01)

(52) U.S. Cl.
  CPC ............ *G06F 3/044* (2013.01); *G06F 3/0416* (2013.01); *G06F 2203/04102* (2013.01); *Y10T 29/49002* (2015.01)

(58) Field of Classification Search
  CPC ........... G06F 3/044; G06F 2203/04107; G06F 2203/04111; G06F 3/041; G06F 2203/04102; Y10T 29/49002
  See application file for complete search history.

(56) References Cited

U.S. PATENT DOCUMENTS

| | | | |
|---|---|---|---|
| 4,074,184 A | 2/1978 | Dechene et al. | |
| 4,090,092 A | 5/1978 | Serrano | |
| 4,186,392 A | 1/1980 | Holz | |

(Continued)

FOREIGN PATENT DOCUMENTS

| | | | |
|---|---|---|---|
| CN | 101334702 A | 12/2008 | |
| EP | 2012168 A2 | 1/2009 | |

(Continued)

OTHER PUBLICATIONS

International Search Report for International Application No. PCT/US10/43272 dated Apr. 11, 2010; 2 pages.

(Continued)

*Primary Examiner* — Ilana Spar
*Assistant Examiner* — Mihir K Rayan

(57) ABSTRACT

A method and apparatus for sensing a conductive object by a mutual capacitance sensing array is described according to an embodiment of the present invention. The mutual capacitance sensing array comprises one or more sensor elements. Each sensor element comprises an outer frame including a conductive material. A cavity is formed within the interior of the outer frame. In an example embodiment, the sensor elements include transmit (TX) sensor elements and receive (RX) sensor elements that are disposed in a stackup that comprises a substrate, where the TX sensor elements are laminated by optically clear adhesive and are disposed on one side of the substrate, and where the RX sensor elements are laminated by optically clear adhesive and are disposed on a different side of the substrate than the TX elements.

16 Claims, 8 Drawing Sheets

(56) References Cited

U.S. PATENT DOCUMENTS

| | | | |
|---|---|---|---|
| 4,233,522 A | 11/1980 | Grummer et al. | |
| 4,671,153 A | 6/1987 | Peyre | |
| 4,686,332 A | 8/1987 | Greanias et al. | |
| 5,063,306 A * | 11/1991 | Edwards | H03K 17/955 327/517 |
| 5,374,787 A | 12/1994 | Miller et al. | |
| 5,488,204 A | 1/1996 | Mead et al. | |
| 5,495,077 A | 2/1996 | Miller et al. | |
| 5,543,588 A | 8/1996 | Bisset et al. | |
| 5,543,590 A | 8/1996 | Gillespie et al. | |
| 5,543,591 A | 8/1996 | Gillespie et al. | |
| 5,648,642 A | 7/1997 | Miller et al. | |
| 5,841,078 A | 11/1998 | Miller et al. | |
| 5,861,583 A | 1/1999 | Schediwy et al. | |
| 5,869,790 A * | 2/1999 | Shigetaka | G06F 3/0414 178/18.01 |
| 5,880,411 A | 3/1999 | Gillespie et al. | |
| 5,889,236 A | 3/1999 | Gillespie et al. | |
| 5,914,465 A | 6/1999 | Allen et al. | |
| 5,952,998 A | 9/1999 | Clancy et al. | |
| 6,002,594 A | 12/1999 | Ledin et al. | |
| 6,028,271 A | 2/2000 | Gillespie et al. | |
| 6,147,680 A | 11/2000 | Tareev | |
| 6,188,391 B1 | 2/2001 | Seely et al. | |
| 6,239,389 B1 | 5/2001 | Allen et al. | |
| 6,380,931 B1 | 4/2002 | Gillespie et al. | |
| 6,411,344 B2 | 6/2002 | Fujii | |
| 6,414,671 B1 | 7/2002 | Gillespie et al. | |
| 6,525,547 B2 | 2/2003 | Hayes | |
| 6,535,203 B2 | 3/2003 | Shigetaka | |
| 6,610,936 B2 | 8/2003 | Gillespie et al. | |
| 6,750,852 B2 | 6/2004 | Gillespie et al. | |
| 6,970,160 B2 | 11/2005 | Mulligan et al. | |
| 7,030,860 B1 | 4/2006 | Hsu et al. | |
| 7,288,946 B2 | 10/2007 | Hargreaves et al. | |
| 7,450,113 B2 | 11/2008 | Gillespie et al. | |
| 7,463,246 B2 | 12/2008 | Mackey | |
| 7,479,949 B2 | 1/2009 | Jobs et al. | |
| 7,548,073 B2 | 6/2009 | Mackey et al. | |
| 7,808,255 B2 | 10/2010 | Hristov et al. | |
| 7,812,829 B2 | 10/2010 | Gillespie et al. | |
| 7,821,274 B2 | 10/2010 | Philipp et al. | |
| 7,821,502 B2 | 10/2010 | Hristov | |
| 7,825,905 B2 | 11/2010 | Philipp | |
| 8,178,810 B2 | 5/2012 | Ratner | |
| 8,599,144 B2 * | 12/2013 | Peng | G06F 3/044 345/173 |
| 8,743,078 B2 * | 6/2014 | Kim | G06F 3/044 345/174 |
| 2002/0186210 A1 * | 12/2002 | Itoh | G06F 3/0418 345/173 |
| 2002/0195271 A1 | 12/2002 | Gailus | |
| 2003/0030443 A1 | 2/2003 | Walker et al. | |
| 2005/0030048 A1 * | 2/2005 | Bolender | G06F 3/0202 324/661 |
| 2005/0052425 A1 | 3/2005 | Zadesky et al. | |
| 2006/0049834 A1 | 3/2006 | Umeda | |
| 2006/0066581 A1 * | 3/2006 | Lyon | G06F 3/044 345/173 |
| 2006/0097991 A1 | 5/2006 | Hotelling et al. | |
| 2007/0062739 A1 | 3/2007 | Philipp et al. | |
| 2007/0097991 A1 | 5/2007 | Tatman | |
| 2007/0247443 A1 | 10/2007 | Philipp | |
| 2007/0257893 A1 | 11/2007 | Philipp | |
| 2007/0262962 A1 * | 11/2007 | XiaoPing | G06F 1/32 345/173 |
| 2007/0279395 A1 | 12/2007 | Philipp et al. | |
| 2008/0041640 A1 | 2/2008 | Gillespie et al. | |
| 2008/0048997 A1 | 2/2008 | Gillespie et al. | |
| 2008/0110739 A1 | 5/2008 | Peng et al. | |
| 2008/0122976 A1 | 5/2008 | Kubota | |
| 2008/0143683 A1 | 6/2008 | Hotelling | |
| 2008/0158183 A1 | 7/2008 | Hotelling et al. | |
| 2008/0277259 A1 * | 11/2008 | Chang | G06F 3/044 200/600 |
| 2008/0297487 A1 | 12/2008 | Hotelling et al. | |
| 2008/0309628 A1 | 12/2008 | Krah et al. | |
| 2008/0309633 A1 * | 12/2008 | Hotelling | G06F 3/0412 345/173 |
| 2009/0091551 A1 | 4/2009 | Hotelling et al. | |
| 2009/0135031 A1 * | 5/2009 | Rockwell | H03K 17/9622 341/33 |
| 2009/0141046 A1 | 6/2009 | Rathnam et al. | |
| 2009/0273573 A1 | 11/2009 | Hotelling | |
| 2010/0079384 A1 * | 4/2010 | Grivna | G06F 3/041 345/173 |
| 2010/0149110 A1 * | 6/2010 | Gray | G06F 3/0416 345/173 |
| 2010/0220075 A1 | 9/2010 | Kuo et al. | |
| 2011/0018829 A1 * | 1/2011 | Peng | G06F 3/044 345/173 |
| 2015/0287381 A1 * | 10/2015 | Kim | G06F 3/044 345/174 |

FOREIGN PATENT DOCUMENTS

| | | |
|---|---|---|
| EP | 2045698 A | 4/2009 |
| EP | 2128743 A | 12/2009 |
| GB | 2455208 A | 6/2009 |
| KR | 20080032790 A | 4/2008 |
| KR | 20100010019 A | 1/2010 |
| WO | 2004010369 A2 | 1/2004 |

OTHER PUBLICATIONS

Korean Intellectual Property Office Notice to File a Response for Korean Patent Application No. 10-2013-7002818 dated Aug. 23, 2016; 3 pages.

USPTO Advisory Action for U.S. Appl. No. 12/842,338 dated Apr. 16, 2013; 3 pages.

USPTO Advisory Action for U.S. Appl. No. 12/842,338 dated Jul. 9, 2015; 3 pages.

USPTO Final Rejection for U.S. Appl. No. 12/842,338 dated Feb. 11, 2013; 17 pages.

USPTO Final Rejection for U.S. Appl. No. 12/842,338 dated Mar. 23, 2015; 22 pages.

USPTO Non-Final Rejection for U.S. Appl. No. 12/842,338 dated Jul. 14, 2014; 14 pages.

USPTO Non-Final Rejection for U.S. Appl. No. 12/842,338 dated Aug. 2, 2012; 16 pages.

USPTO Non-Final Rejection for U.S. Appl. No. 12/842,338 dated Dec. 31, 2014; 14 pages.

Written Opinion of the International Searching Authority for International Application No. PCT/US10/43272 dated Apr. 11, 2010; 4 pages.

SIPO Chinese Office Action for International Application No. 201080068108.4 dated Aug. 3, 2015; 5 pages.

* cited by examiner

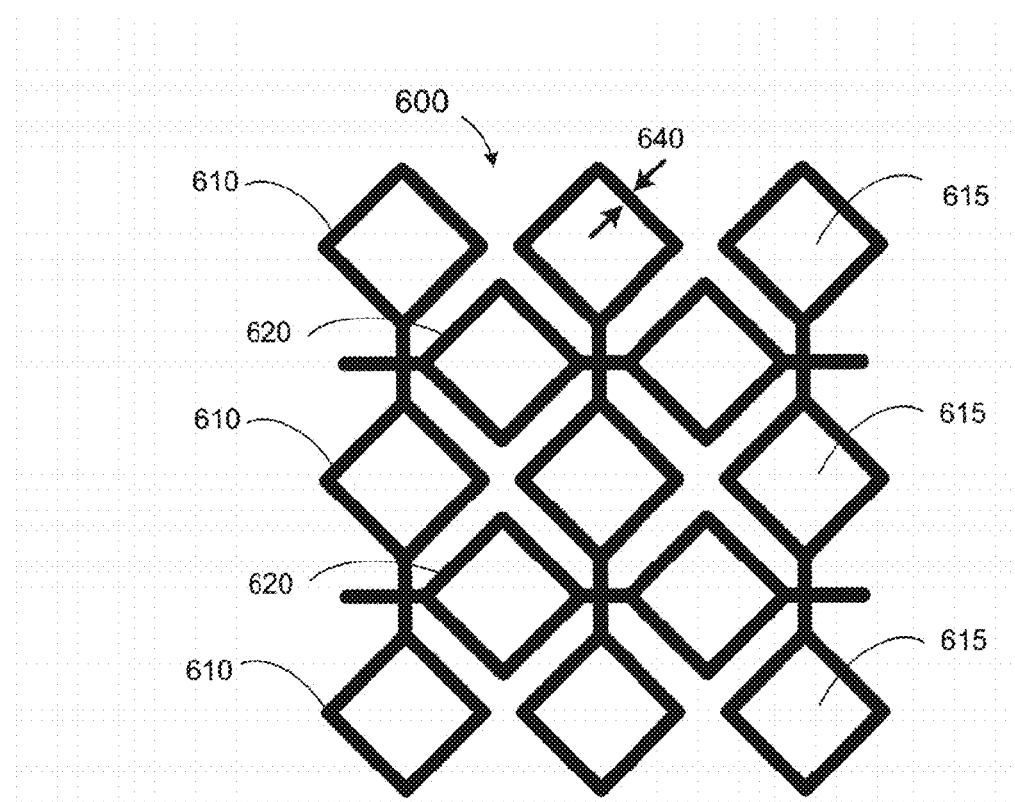
FIG. 6A
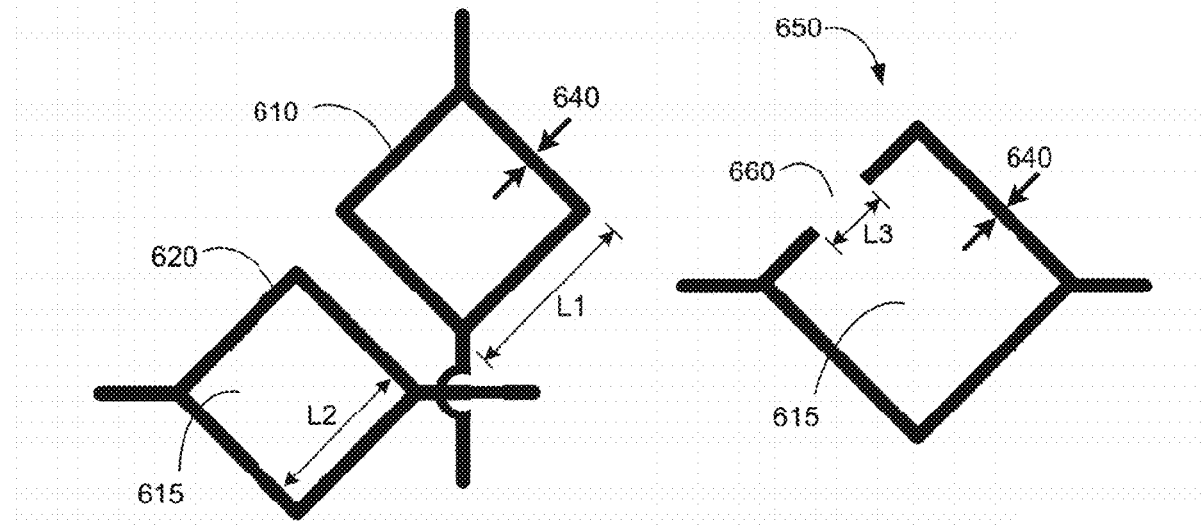
FIG. 6B
FIG. 6C

MUTUAL CAPACITANCE SENSING ARRAY

RELATED APPLICATIONS

This application claims priority as a Continuation-In-Part of U.S. application Ser. No. 12/842,338, filed on Jul. 23, 2010, the entire content of which is incorporated by reference herein and which in turn claims priority to U.S. Provisional Application No. 61/228,476, filed on Jul. 24, 2009, the entire content of which is incorporated by reference herein.

TECHNICAL FIELD

This disclosure generally relates to the field of user interface devices and, in particular, to capacitive sensor devices.

BACKGROUND

Capacitive touch sensors may be used to replace mechanical buttons, knobs and other similar mechanical user interface controls. The use of a capacitive sensor allows for the elimination of complicated mechanical switches and buttons, providing reliable operation under harsh conditions. In addition, capacitive sensors are widely used in modern customer applications, providing new user interface options in existing products. Capacitive touch sensors can be arranged in the form of a sensor array for a touch-sensing surface. When a conductive object, such as a finger, comes in contact or close proximity with the touch-sensing surface, the capacitance of one or more capacitive touch sensors changes. The capacitance changes of the capacitive touch sensors can be measured by an electrical circuit. The electrical circuit converts the measured capacitances of the capacitive touch sensors into digital values.

A capacitive touch sensor configured to detect an input, such as proximity or contact with a finger or other object, may have a capacitance $C_P$ between the sensor element and ground when no input is present. The capacitance $C_P$ is known as the parasitic capacitance of the sensor. For capacitive sensors having multiple sense elements, a mutual capacitance $C_M$ may also be present between two or more sense elements. An input detected by the sensor may cause a change in capacitance $C_F$ that is much smaller than $C_P$ or $C_M$. Accordingly, where the sensor capacitance is represented as a digital code, the parasitic or mutual capacitances may be represented by a larger proportion of the discrete capacitance levels resolvable by the digital code, while the capacitance change $C_F$ is represented by fewer of these discrete levels. In such cases, the capacitance change $C_F$ due to an input may not be resolvable to a high degree of resolution.

A problem associated with some capacitive sensing systems is the high power dissipation associated with the switching power required to access each row and column in an X-Y capacitance sensor array. While a large number of sensor elements may increase the accuracy or resolution of detection, the increased capacitance will result in greater power requirements.

BRIEF DESCRIPTION OF THE DRAWINGS

The present invention is illustrated by way of example, and not of limitation, in the figures of the accompanying drawings in which:

FIG. 6A illustrates an embodiment of a capacitive sensor array according to an embodiment of the present invention.

FIG. 6B illustrates an expanded view of two sensor elements of a capacitance sensor array according to an embodiment of the present invention.

FIG. 6C illustrates an alternative embodiment for the outer frame of a sensor element.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

A mutual capacitance sensing array is described herein. The mutual capacitance sensing array includes a plurality of sensor elements comprising an outer frame with a cavity formed within the interior of the outer frame. The sensor elements described herein may provide a reduction in power dissipation associated with the switching power of the sensing array.

Figure 1:
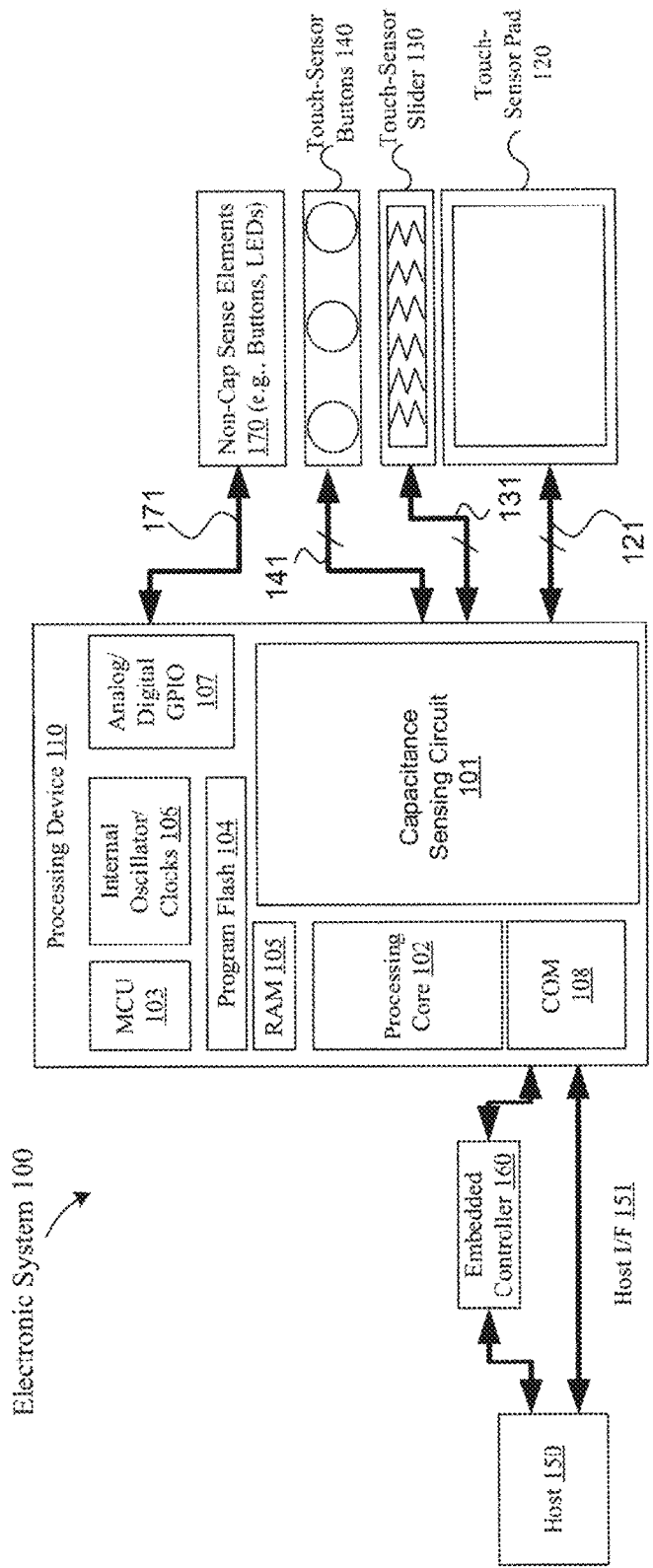
FIG. 1 illustrates a block diagram of one embodiment of an electronic system having a processing device for detecting a presence of a conductive object according to an embodiment of the present invention.

FIG. 1 illustrates a block diagram of one embodiment of an electronic system having a processing device for detecting a presence of a conductive object according to an embodiment of the present invention. Electronic system 100 includes processing device 110, touch-sensor pad 120, touch-sensor slider 130, touch-sensor buttons 140, host processor 150, embedded controller 160, and non-capacitance sensor elements 170. The processing device 110 may include analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO 107.

As illustrated, capacitance sensing circuit 101 may be integrated into processing device 110. Capacitance sensing circuit 101 may include analog I/O for coupling to an external component, such as touch-sensor pad 120, touch-sensor slider 130, touch-sensor buttons 140, and/or other devices. Capacitance sensing circuit 101 and processing device 110 are described in more detail below.

The embodiments described herein are not limited to touch-sensor pads for notebook implementations, but can be used in other capacitive sensing implementations, for example, the sensing device may be a touch screen, a touch-sensor slider 130, or touch-sensor buttons 140 (e.g., capacitance sensing buttons). In one embodiment, these sensing devices may include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multimedia control (ex. volume, track advance, etc) handwriting recognition and numeric keypad operation.

In one embodiment, the electronic system 100 includes a touch-sensor pad 120 coupled to the processing device 110 via bus 121. Touch-sensor pad 120 may include a multi-dimension sensor array. The multi-dimension sensor array includes multiple sensor elements, organized as rows and columns. In another embodiment, the electronic system 100 includes a touch-sensor slider 130 coupled to the processing device 110 via bus 131. Touch-sensor slider 130 may include a single-dimension sensor array. The single-dimension sensor array includes multiple sensor elements, organized as rows, or alternatively, as columns. In another embodiment, the electronic system 100 includes touch-sensor buttons 140 coupled to the processing device 110 via bus 141. Touch-sensor buttons 140 may include a single-dimension or multi-dimension sensor array. The single- or multi-dimension sensor array may include multiple sensor elements. For a touch-sensor button, the sensor elements may be coupled together to detect a presence of a conductive object over the entire surface of the sensing device. Alternatively, the touch-sensor buttons 140 may have a single sensor element to detect the presence of the conductive object. In one embodiment, touch-sensor buttons 140 may include a capacitive sensor element. Capacitive sensor elements may be used as non-contact sensor elements. These sensor elements, when protected by an insulating layer, offer resistance to severe environments.

The electronic system 100 may include any combination of one or more of the touch-sensor pad 120, touch-sensor slider 130, and/or touch-sensor button 140. In another embodiment, the electronic system 100 may also include non-capacitance sensor elements 170 coupled to the processing device 110 via bus 171. The non-capacitance sensor elements 170 may include buttons, light emitting diodes ("LEDs"), and other user interface devices, such as a mouse, a keyboard, or other functional keys that do not require capacitance sensing. In one embodiment, buses 171, 141, 131, and 121 may be a single bus. Alternatively, these buses may be configured into any combination of one or more separate buses.

Processing, device 110 may include internal oscillator/clocks 106 and communication block ("COM") 108. The oscillator/clocks block 106 provides clock signals to one or more of the components of processing device 110. Communication block 108 may be used to communicate with an external component, such as a host processor 150, via host interface ("I/F") line 151. Alternatively, processing block 110 may also be coupled to embedded controller 160 to communicate with the external components, such as host 150. In one embodiment, the processing device 110 is configured to communicate with the embedded controller 160 or the host 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 may be a Programmable System on a Chip ("PSoC™") processing device, manufactured by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 110 may also be done in the host.

Capacitance sensing circuit 101 may be integrated into the IC of the processing device 110, or alternatively, in a separate IC. Alternatively, descriptions of capacitance sensing circuit 101 may be generated and compiled for incorporation into other integrated circuits. For example, behavioral level code describing capacitance sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensing circuit 101.

It should be noted that the components of electronic system 100 may include all the components described above. Alternatively, electronic system 100 may include only some of the components described above.

In one embodiment, electronic system 100 may be used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Figure 2:
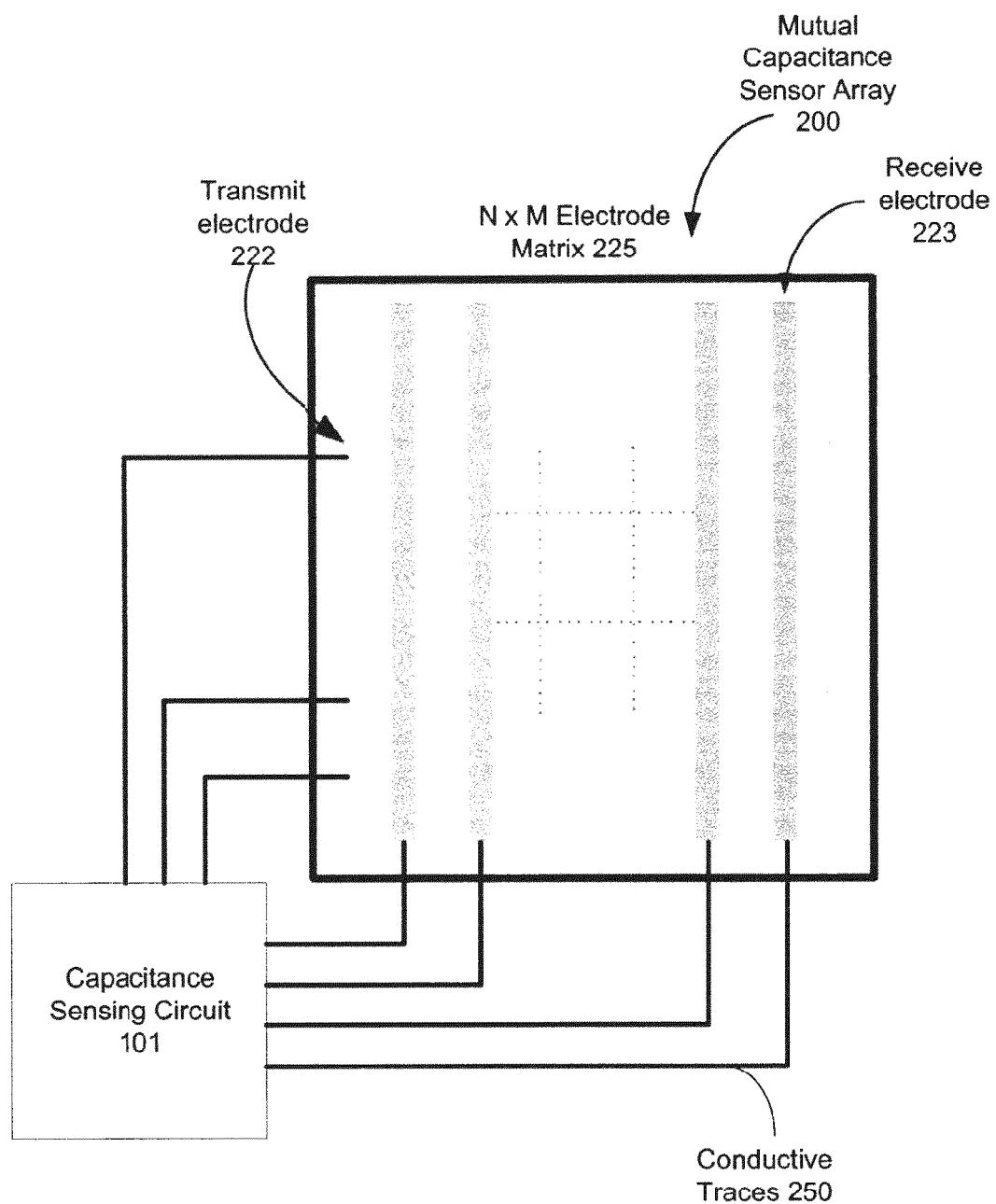
FIG. 2 is a block diagram illustrating one embodiment of a transmit-receive capacitive touchpad sensor and a capacitance sensing circuit that converts measured capacitances to touchpad coordinates.

FIG. 2 is a block diagram illustrating one embodiment of a mutual capacitance sensor array 200 comprising an N×M electrode matrix 225 and a capacitance sensing circuit 101 that converts measured capacitances to touchpad coordinates. The mutual capacitance sensor array 200 may be, for example, the touch sensor pad 120 of FIG. 1. The N×M electrode matrix 225 includes N×M electrodes (N receive electrodes and M transmit electrodes), which further includes transmit ("TX") electrode 222 and receive ("RX") electrode 223. Each of the electrodes in N×M electrode matrix 225 is connected with capacitance sensing circuit 101 by conductive traces 250. In one embodiment, capacitance sensing circuit 101 may operate using a charge accumulation technique as discussed further below in FIG. 5B.

Although some embodiments described herein are described using a charge accumulation technique, the capacitance sensing circuit 101 may operate based on other techniques, such as a current versus voltage phase shift measurement, capacitive bridge divider, and charge-accumulation circuits.

The transmit and receive electrodes in the N×M electrode matrix 225 are arranged so that each of the transmit electrodes intersects each of the receive electrodes. Thus, each transmit electrode is capacitively coupled with each of the receive electrodes. For example, transmit electrode 222 is capacitively coupled with receive electrode 223 at the point where transmit electrode 222 and receive electrode 223 intersect.

Because of the capacitive coupling between the transmit and receive electrodes, a TX signal (not shown) applied to each transmit electrode induces a current at each of the receive electrodes. For instance, when a TX signal is applied to transmit electrode 222, the TX signal induces an RX signal (not shown) on the receive electrode 223 in N×M electrode matrix 225. The RX signal on each of the receive electrodes can then be measured in sequence by using a multiplexor to connect each of the N receive electrodes to a demodulation circuit in sequence. The capacitance associated with each intersection between a TX electrode and an RX electrode can be sensed by selecting every available combination of TX electrode and RX electrode.

When an object, such as a finger, approaches the N×M electrode matrix 225, the object causes a decrease in capacitance affecting only some of the electrodes. For example, if a finger is placed near the intersection of transmit electrode 222 and receive electrode 223, the presence of the finger will decrease the capacitance between the two electrodes 222 and 223. Thus, the location of the finger on the touchpad can be determined by identifying both the receive electrode having a decreased capacitance and the transmit electrode to which the TX signal was applied at the time the decreased capacitance was measured on the receive electrode. Thus, by sequentially determining the capacitances associated with each intersection of electrodes in the N×M electrode matrix 225 the locations of one or more inputs can be determined. The conversion of the induced current waveform to touch coordinates indicating a position of an input on a touch sensor pad is known to those skilled in the art.

Figure 3:
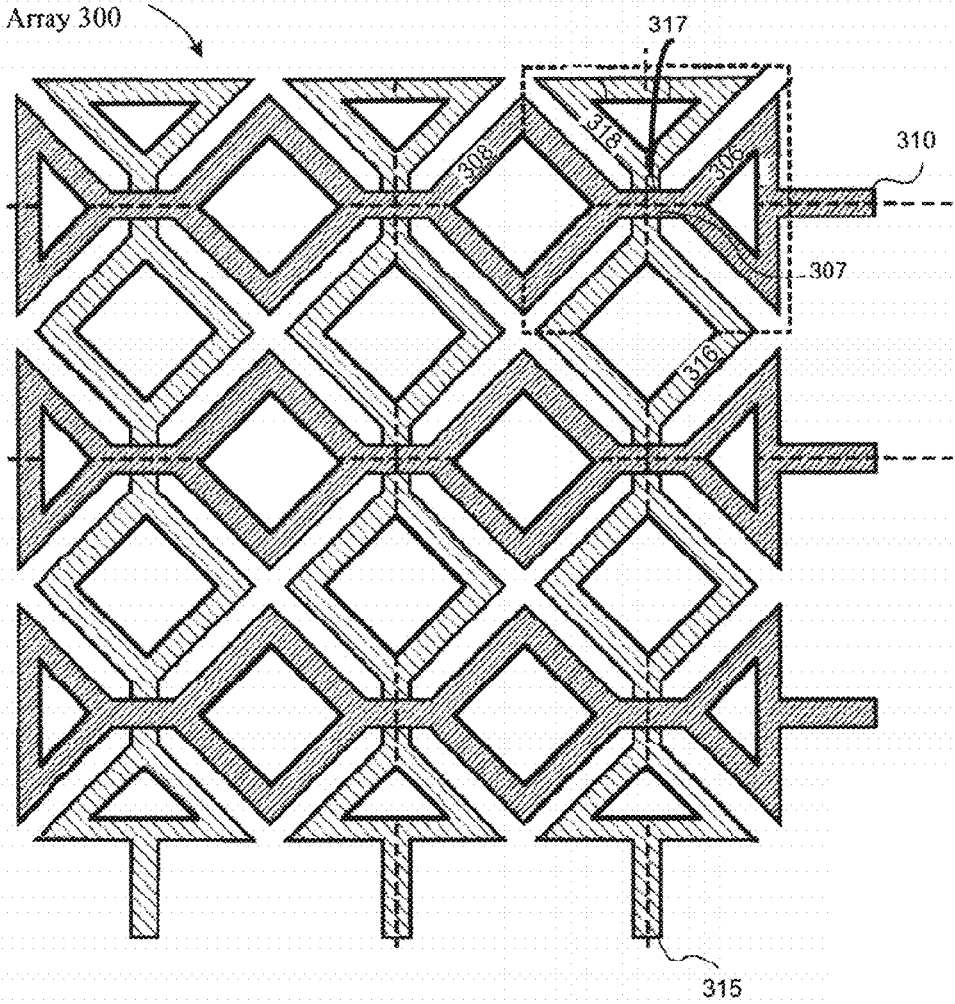
FIG. 3 illustrates a plan view of an exemplary embodiment of a capacitance sensor array.

FIG. 3 is a plan view of an exemplary embodiment of a mutual capacitance sensor array 300. A first substrate contains the column sensor elements 316 and 318 electrically coupled to each other by a column interconnect 317 and further coupled to a column I/O 315 to form a column oriented along the Y-axis. The Y-axis I/O's correspond to the transmit electrodes of FIG. 2. The first substrate is aligned to a second substrate containing row sensor elements 306 and 308 electrically coupled to each other by a row interconnect 307 and further coupled to a row I/O 310 to form a row oriented along the X-axis. The X-axis I/O's correspond to the receive electrodes of FIG. 2. The orientation of the axes may be switched configured in other configurations known to those skilled in the art. As depicted, the primary sensor elements are substantially diamond shaped and overlap only at the vertices along a row or column to limit the parasitic capacitance ($C_p$) caused by the overlap of the first and second layer.

Figure 4:
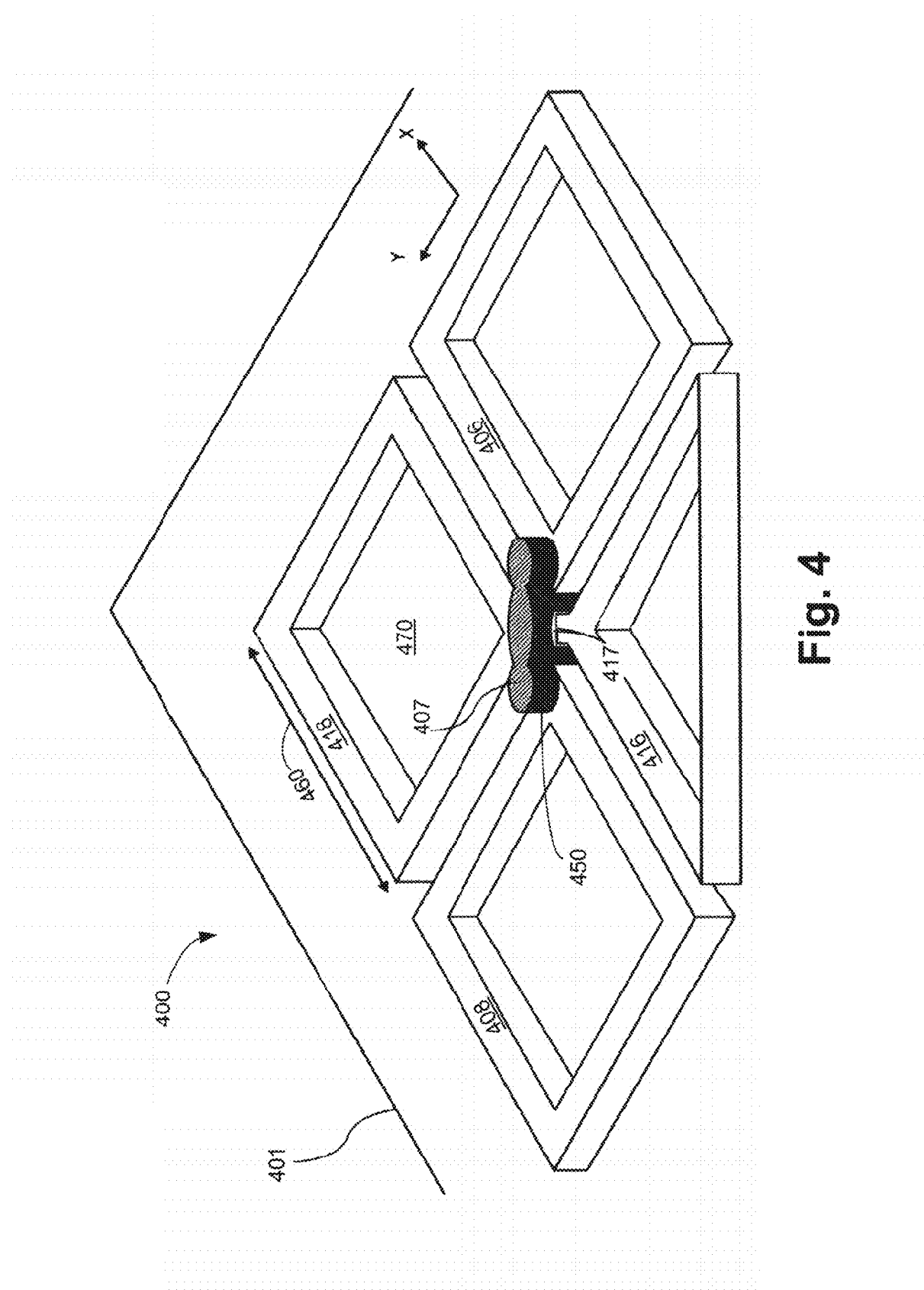
FIG. 4 illustrates an isometric view plurality of capacitance sensor elements configured into a sensor array according to an embodiment of the present invention.

FIG. 4 illustrates an isometric view plurality of capacitance sensor elements configured into a sensor array 400 according to an embodiment of the present invention. FIG. 4 differs from FIG. 3 in that the capacitance sensors (306, 308) of FIG. 3 on the X-coordinate axis reside on a different plane than the capacitance sensors (316, 318) on the Y-coordinate axis. In FIG. 4, both the X and Y axis capacitive sensors reside on the same plane (substrate 401). Sensor array 400 is two-dimensional, but one-dimensional arrays, as well as n-dimensional arrays having more than two dimensions may be used as alternative embodiments. The sensor array layer may be contained on a substrate, such as substrate 401. The substrate 401 may be any optically transmissive and insulative substrate, such as but not limited to, quartz, sapphire, glass, plastic and polymer/resins.

In an embodiment, individual sensor elements, such as sensor elements 406, 408, 416 and 418 are configured as substantially diamond shaped polygons of an optically transmissive conductive material. Any material known to be transmissive over at least a portion of the wavelength band emitted by the display to be paired with the sensor array 400 may be employed for the sensor elements. In one embodiment, individual sensor elements are formed of an optically transmissive conductive material, such as, but not limited to indium tin oxide (ITO), poly(3,4-ethylenedioxythiophene) poly(styrenesulfonate) (PEDOT-PSS), carbon nanotubes, conductive ink, graphite/graphene and the like. In a further embodiment, as depicted in FIG. 4, all sensor elements of a sensor array are formed of a same layer of optically transmissive conductive material. Using a single layer of ITO, for example, may allow the various dimensions and tolerances of the sensor array to be more readily achieved with existing manufacturing equipment.

In one embodiment, the sensor elements 406, 408, 416, and 418 may be a non-transparent or opaque conductive material disposed on a transparent surface such as a touch screen. The conductive material may be constructed of sufficiently small dimensions to minimize visual detection. In another embodiment, the sensor elements 406, 408, 416, and 418 may be oriented to align with an LCD pixel pitch and mask boundaries in a touch screen application to help further obscure visual detection of the sensor array 400.

Sensor elements of a sensor array may be coupled into either a row or a column by an interconnect, such as column interconnect 407 or row interconnect 417 in sensor array 400. As shown in FIG. 4, a same layer(s) of transmissive conductive material forms all of the capacitance sensor elements of the array. For example, sensor elements 406, 408, 416 and 418 are depicted as a same layer of material. Row interconnect 417, as depicted, may be of the same layer of transmissive conductive material (e.g., indium tin oxide (ITO), conductive ink, or graphite) as that employed for the sensor elements 406, 408, 416 and 418. Column interconnect 407, disposed over the row interconnect 417 is made of a second layer of conductive material, separated from row interconnect 417 by an insulative spacer 450. The second layer of conductive material providing the column interconnect 407 may be coupled directly to the sensor elements 406 and 408 with vias (not shown) extending through the insulative spacer 450. In particular embodiments, row interconnect 417 is of a second optically transmissive conductive material, such as ITO formed over the first layer. In alternate embodiments however, row interconnect 417 and column interconnect 407 may be of an optically opaque conductive material, such as, but not limited to, carbon, polysilicon, aluminum, gold, silver, titanium, tungsten, tantalum, indium, tin, or copper. As discussed in further detail elsewhere herein, the presence of optically opaque interconnect may nonetheless induce few, if any, visible artifacts in a touch screen. Insulative spacer 450 may be any optically transparent insulator, such as, but not limited to silicon dioxide, silicon nitride, polymers, and the like. In one embodiment, the thickness of insulative spacer 450 is approximately 50 nanometer (nm) thick.

Figure 5A:
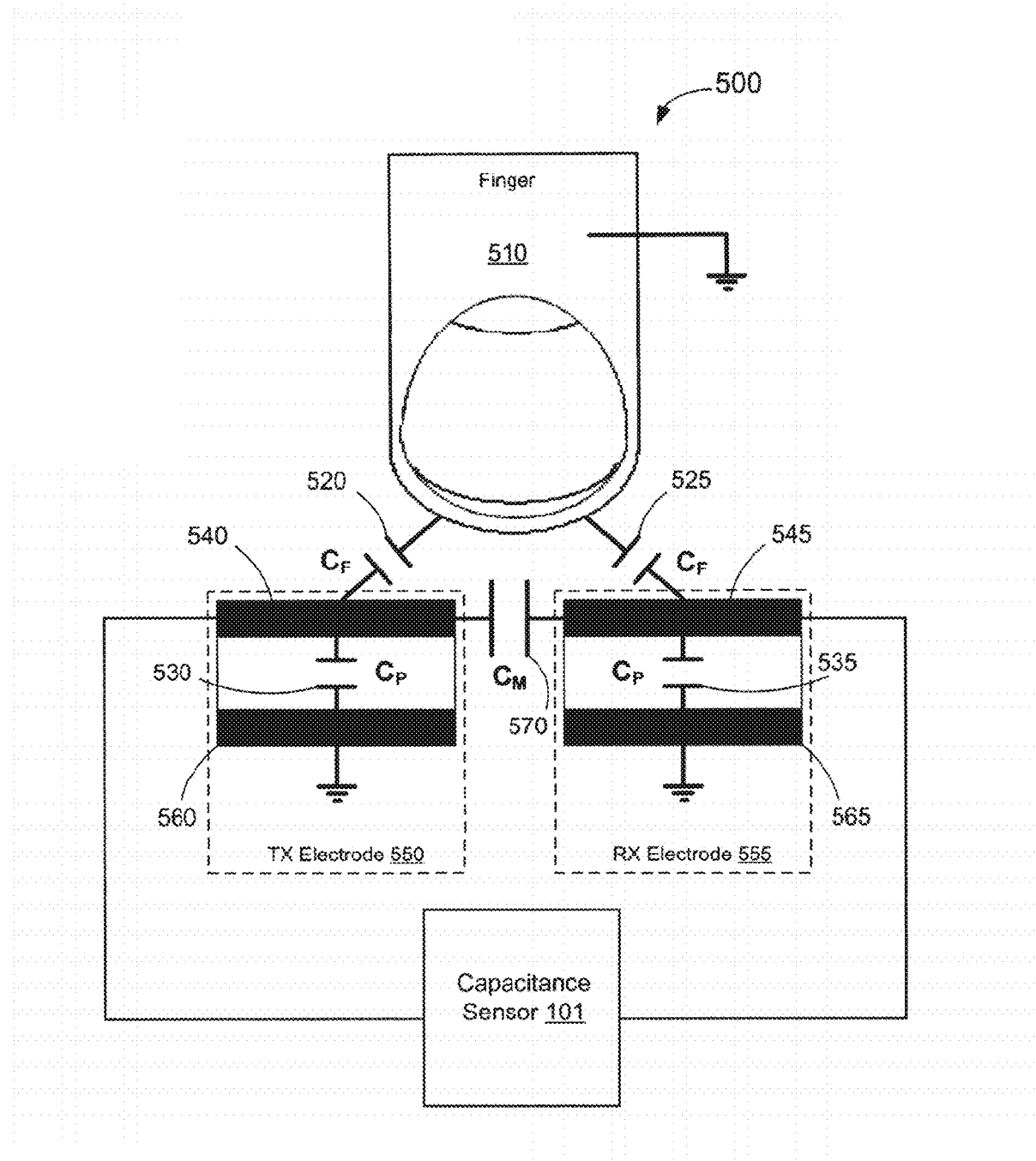
FIG. 5A illustrates the electrical characteristics of a pair of transmit-receive capacitive sensor elements according to an embodiment of the present invention.

FIG. 5A illustrates the electrical characteristics of a pair TX-RX capacitive sensor elements 500 ("TX-RX 500") according to an embodiment of the present invention. The TX-RX 500 includes a finger 510, a TX electrode 550, an RX electrode 555, and a capacitance sensor 101. The TX electrode 550 includes an upper conductive plate 540 ("UCP 540") and a lower conductive plate 560 ("LCP 560"). The RX electrode 555 includes an upper conductive plate 545 ("UCP 545") and a lower conductive plate 565 ("LCP 565").

The capacitance sensor 101 is electrically connected to the upper conductive plates 540 and 545 of TX electrode 550 and RX electrode 565, respectively. The upper conductive plates 540 and 545 are separated from the lower conductive plates 560 and 565, respectively, by air, dielectric, or any non-conductive material known to those skilled in the art. Similarly, the upper conductive plates 540 and 545 are separated from one another by air or dielectric material. The finger 510 and lower conductive plates 560 and 565 are electrically grounded.

Each of the transmit and receive electrodes 550 and 555, respectively, has a parasitic capacitance $C_P$ and a mutual capacitance $C_M$. The parasitic capacitance of a sensor element (TX/RX electrode) is the capacitance between the sensor element and ground. In the TX electrode 550, the parasitic capacitance is the capacitance between the UCP 540 and the LCP 560 as depicted by $C_P$ 530. In the RX electrode 555, the parasitic capacitance is the capacitance between the UCP 545 and the LCP 565 as depicted by $C_P$ 535. The mutual capacitance of the sensor element is the capacitance between the sensor element and other sensor elements. Here, the mutual capacitance is the capacitance between TX electrode 550 and RX electrode 555, denoted as $C_M$ 570.

The proximity of an object, such as a finger 510, near the electrodes 550 and 555 may change the capacitance between the electrodes as well as the capacitance between the electrodes and ground. The capacitance between the finger 510 and the electrodes is shown in FIG. 5 as $C_F$ 520 and $C_F$ 525. $C_F$ 520 is the capacitance between the UCP 540 and the finger 510. $C_F$ 525 is the capacitance between the UCP 545 and the finger 510. The magnitude of the change in capacitance induced by the finger 510 can be detected and converted to a voltage level or a digital code that can be processed by a computer or other circuit as described above. In one exemplary embodiment, Cf may range from approximately 10-30 picofarads (pF). Alternatively, other ranges may occur.

The measured capacitance of the sensor elements as seen from capacitance sensor 101 includes the parasitic and mutual capacitances $C_P$ and $C_M$ in addition to $C_F$. The baseline capacitance may be described as the capacitance of the sensor element when no input (i.e., a finger touch) is present, or $C_P$ and $C_M$. The capacitance sensing circuit 101 and supporting circuitry must be configured to resolve a difference between the baseline capacitance and the capacitance including $C_F$ in order to accurately detect a legitimate presence of a conductive object. This is further discussed in FIG. 2 and is generally known to those skilled in the art.

Figure 5B:
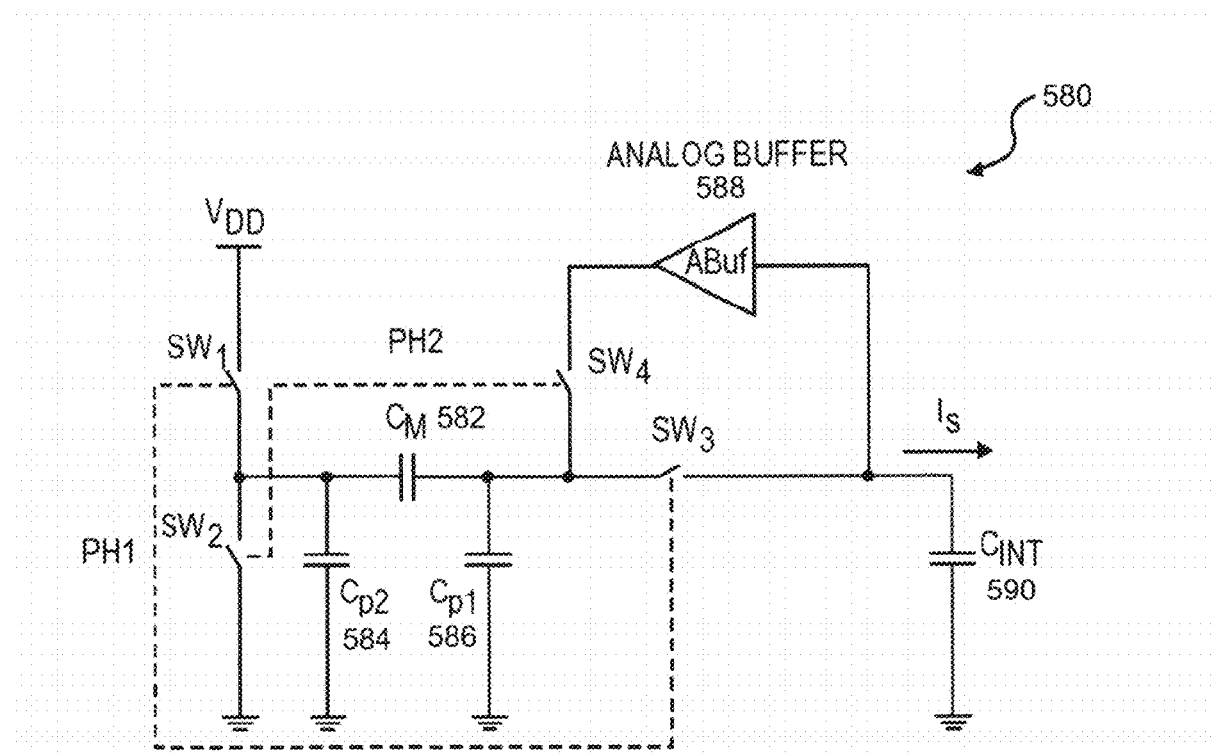
FIG. 5B illustrates a mutual capacitance sensing circuit for sensing the mutual capacitance of the capacitor $C_M$ in a mutual capacitance sensing mode according to an embodiment of the present invention.

FIG. 5B illustrates a mutual capacitance sensing circuit 580 for sensing the mutual capacitance of the capacitor $C_M$ 582 in a mutual capacitance (transmitter-receiver or TX-RX) sensing mode according to an embodiment of the present invention. The capacitance sensing circuit 580 is one embodiment of the capacitance sensing circuit 101 in FIGS. 1, 2, and 5A. The capacitor $C_{P1}$ 584 and $C_{P2}$ 586 represent the parasitic capacitances of two sensor elements. The capacitance sensing circuit 580 may operate using two non-overlapping phases: PH1 and PH2, which cycle repeatedly. During PH1, the switches SW1 and SW3 are turned on, while during PH2, the switches SW2 and SW4 are turned on. The switches SW1 and SW2 function as a transmitter driver that charges the capacitor $C_M$ 582 during PH1 when SW1 and SW3 are turned on and discharges the capacitor $C_M$ 582 during PH2 when SW2 and SW4 are turned on.

The switches SW3 and SW4 function as current demodulation receiver switches. The analog buffer 588 keeps the receiver electrode potential approximately the same during both PH1 and PH2 operation phases, shielding the circuit 580 from the $C_{P1}$ 586 parasitic capacitance change. It should be noted that the integration capacitor $C_{INT}$ 590 is considered part of the capacitance sensing circuit 580 and is shown here for ease of explanation. During PH1, i.e., the charge cycle, the voltage potential for the capacitor Cm 582 is $V_{CM}=V_{DD}-V_{CINT}$, the voltage potential for the parasitic capacitors $C_{P1}$ 586 and $C_{P2}$ 584 are $V_{CP1}=V_{CINT}$, $V_{CP2}=V_{DD}$. During PH2, i.e., the discharge cycle, the voltage potential for the capacitor $C_M$ 582 is $V_{CM}=V_{ABUF}=V_{CINT}=V_{CP1}$. The process of turning off and on the switches SW1-SW4 during PH1 and PH2 may be repeated sequentially for all of the sensor elements in the sensor array such as, for example, mutual capacitance sensor array 200. The amount of power dissipated across all of the capacitance sensors of mutual capacitance sensor array 200 during the sequential switching process is the switching power of the mutual capacitance sensor array.

FIG. 6A illustrates a capacitance sensor array 600 according to an embodiment of the present invention. The capacitance sensor array 600 includes a series of electrically coupled capacitance sensors 610 and 620 arranged on an X-axis and Y-axis, respectively, similarly as to that described in FIG. 3. In one embodiment, the capacitance sensors 610 and 620 feature a substantially diamond shaped outer frame 640 with a similarly shaped cavity 615 configured within the outer frame, thereby reducing the total conductive surface area of the individual sensors.

FIG. 6B illustrates an expanded view of two sensor elements of a capacitance sensor array 600 according to an embodiment of the present invention. FIG. 6B includes one of the X-axis capacitance sensors 610 and a Y-axis capacitance sensor 620. Both capacitance sensors 610 and 620 feature an outer frame 640 and a cavity 615. The length of one side of the capacitance sensors 610 and 620 is denoted by $L_1$. The length of one side of the cavity 615 is denoted by $L_2$. Alternative shapes for capacitance sensors may yield different dimensions for $L_1$ and $L_2$. The cavity may be substantially the same shape and concentric to the outer frame 640, however other shapes and positional schemes may be used. The capacitance sensors 610 and 620 featuring a reduced conductive area (due to the fact that the area of the outer frame 640 is less than that of a solid diamond frame (e.g., area of conductive outer frame=$L_1^2-L_2^2$) may yield significantly improved performance characteristics. For example, the switching power associated with mutual capacitance sensors, as known to those skilled in the art, is governed by the equation:

$$P_S = C * V^2 \quad (1)$$

In equation 1, $P_S$ is the switching power, C is the capacitance of the sensor element, and $V^2$ is the voltage detected by a capacitance sensor. The capacitance of a standard parallel plate capacitor is determined by the equation:

$$C = \epsilon_r * \epsilon_0 * A/d \quad (2)$$

In equation 2. $\epsilon_r$ is the relative static permittivity, $\epsilon_0$ is the electric constant, d is the separation between plates, and A is the area of overlap of the two plates. Therefore, C is directly related to the area of overlap of the two conductive plates. By substituting (2) into (1), a direct relationship exists between switching power and capacitance. It can be seen that by reducing the overall conductive area of the capacitive sensor elements, the switching power can be significantly reduced. By way of example and not limitation, the parasitic capacitance for a solid diamond shaped capacitance sensor with $L_1$ equal to 5 mm may be approximately 1-2 pF. The capacitance sensors shown in FIG. 6B with 5 mm sides may yield a capacitance approximately 50%-90% of that value or 0.1 pF-1 pF.

In addition to reducing the parasitic capacitance, the self-capacitance of a conductive object, e.g. a finger, will also be reduced. In a conductive object such as a finger, the parallel plates, as applied in here in conjunction with equation (2), are the conductive object and the conductive area of the capacitive sensor. The reduction in the overlapping surface area due to the cavity in the capacitive sensor will yield a reduction in capacitance similar to the parasitic capacitance. The reduction in the self-capacitance of the conductive object will also yield less switching power consumption and may yield a reduction in negative signals and other "noise" known to those skilled in the art.

Though the capacitance sensors 610 and 620 may provide a reduced parasitic capacitance and self-capacitance of a conductive object, the mutual capacitance between capacitance sensors 610 and 620 will substantially remain the same. The mutual capacitance, as described above, is dependent upon the distance between the metal plates. i.e., distance between the outer frames 640 of capacitance sensors 610 and 620. Thus, a cavity 615 of any size within the outer frame 640 will not affect the distance between the outer frames 640 of adjacent capacitance sensors 610 and 620. Consequently, the mutual capacitance between the adjacent capacitance sensors 610 and 620 will remain substantially unchanged.

The outer frame 640 of capacitance sensors 610 and 620 may be composed of copper, gold, silver, aluminum, or any conductive material or combination thereof known to those skilled in the art. Furthermore, the conductive material may be transparent to accommodate touch screens applications. The outer frames may be configured in a wide variety of shapes including substantially diamond, square, circular, triangular, hexagonal, trapezoidal, or other shapes and polygons known to those skilled in the art. The cavity 615 of capacitance sensors 610 and 620 may be configured in a similar shape as the outer frame to create a substantially uniform width of conductive material throughout the outer frame, however a non-uniform outer frame may also be used.

The cavity 615 within the outer frame 640 may be hollow, comprise a gas, or a non-conductive dielectric material known to those skilled in the art. A dielectric material disposed in the cavity 615 may be configured to be electrically grounded, floating, or virtually grounded. Details on grounding methodologies are well known in the art and thus not described further herein. A dielectric material disposed in the cavity 615 within the outer frame may be co-planar with the outer frame 640. Alternatively, the dielectric material may be non-coplanar with the outer frame 640.

Though a reduction in outer frame 640 area may decrease parasitic (530, 535) and self-capacitance of the conductive object (520, 525), the resistance of the outer frame 640 may increase resulting in reduced sensitivity to changes in capacitance. In one embodiment, the cavity 615 area may vary from 50%-90% resulting in a 70% to 95% frame width reduction. In one embodiment. $L_1$ for both capacitance sensors 610 and 620 is 5 mm with an outer frame 640 width of 0.6 mm ($L_2$=3.8 mm), resulting in approximately 58% reduction in surface area.

Alternatively, the outer frame 640 of the capacitance sensor 650 of FIG. 6C need not be continuous and may include gaps or spaces of varying sizes and shapes according to an embodiment of the present invention. Capacitance sensor 650 includes an outer frame 640, a cavity 615, and a gap 660 located in the outer frame 640 with length $L_3$. There may be one gap 660 or a plurality of gaps of various sizes and lengths. The gap 660 may be located anywhere on the outer frame 640. The gap 660 may be filled with a non-conductive dielectric material.

The particular features, structures or characteristics described herein may be combined as suitable in one or more embodiments of the invention. In addition, while the invention has been described in terms of several embodiments, those skilled in the art will recognize that the invention is not limited to the embodiments described. The embodiments of the invention can be practiced with modification and alteration within the scope of the appended claims. The specification and the drawings are thus to be regarded as illustrative instead of limiting on the invention.

Figure 7:
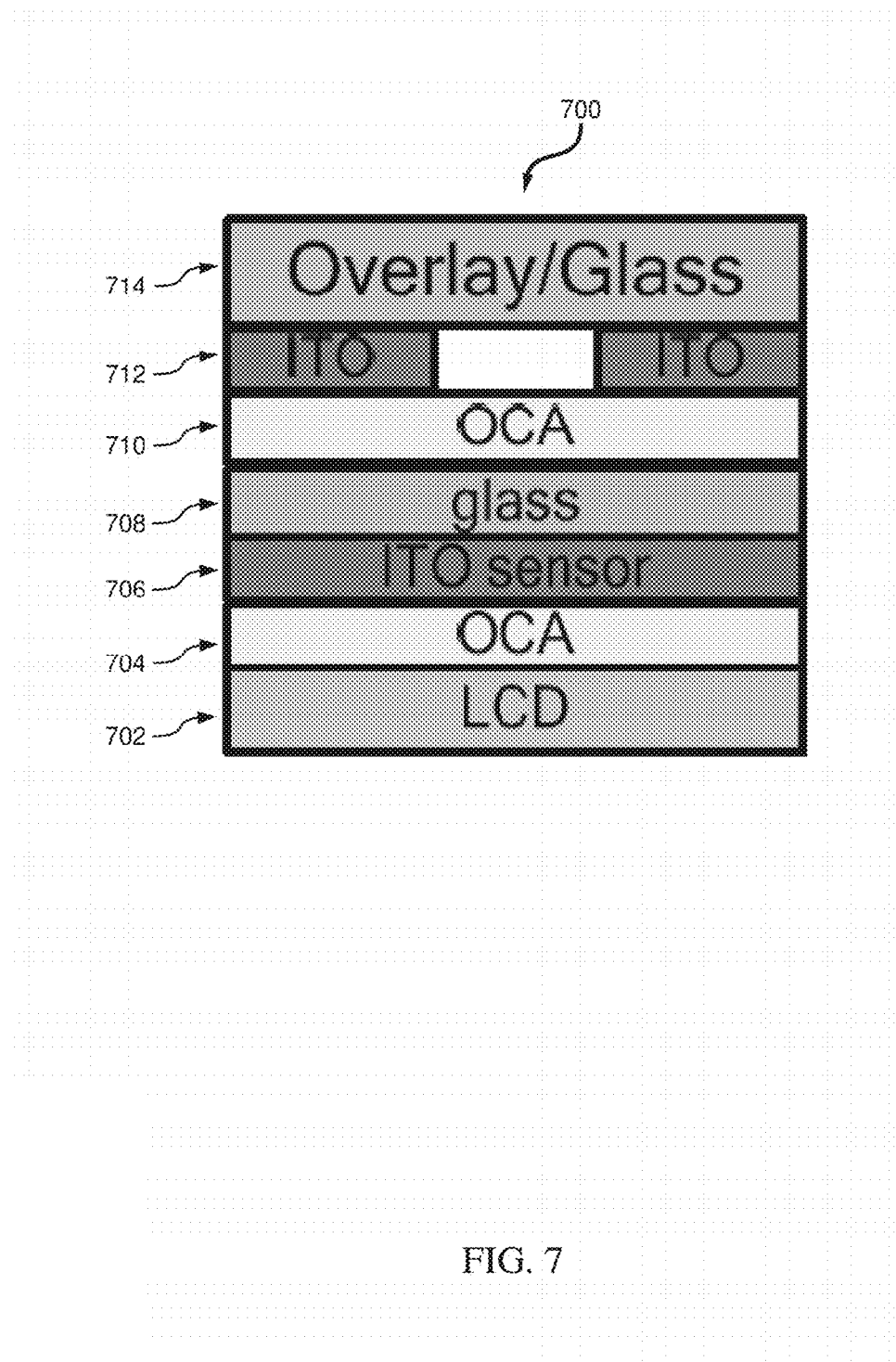
FIG. 7 illustrates an example stackup in which hollow-diamond sensor elements may be disposed, according to some embodiments.

FIG. 7 illustrates a cross-section schematic diagram of an example stackup in which hollow-diamond sensor elements may be disposed, according to some embodiments. It is noted that the schematic diagram in FIG. 7 does not necessarily show all layers and sub-layers that may be included in an actual implementation of a stackup for a mutual capacitance sensing array; thus, the schematic diagram in FIG. 7 is to be regarded in an illustrative rather than a restrictive sense.

In FIG. 7, stackup 700 comprises liquid crystal display (LCD) 702, an Optically-Clear Adhesive (OCA) layer 704, an indium-tin oxide (ITO) layer 706, a substrate 708, another OCA layer 710, another ITO layer 712, and an overlay 714. LCD 702 has a layered structure that is illuminated by one or more light sources (not shown) to produce visible images. The structure of LCD 702 may include various layers (e.g., such as bottom polarizing layer, thin-film transistor layer, liquid crystal layer, color filter layer, and top polarizing layer) that are configured to facilitate the operation of the LCD. OCA layer 704 is disposed on or above LCD 702 and is typically comprised of an optically clear adhesive. ITO sensor layer 706 is disposed on the bottom of substrate 708 and may be laminated by OCA layer 704 on its side that faces LCD 702. ITO sensor layer 706 may include rows or columns of sensor elements. For example, TX sensor elements with a particular structure (e.g., such as the structure of the sensor elements of FIGS. 3, 6A, 6B, 6C, etc.) may be disposed in ITO layer 706. Substrate 708 is made of glass, but it is noted that in other embodiments the substrate may be made of different, non-glass transparent materials. OCA layer 710 comprises an optically clear adhesive that is disposed on or above substrate 708. ITO sensor layer 712 is disposed on top of substrate 708 and may be attached to the substrate via OCA layer 710. ITO sensor layer 712 may include rows or columns of sensor elements. For example, RX sensor elements with a particular structure (e.g., such as the structure of the sensor elements of FIGS. 3, 6A, 6B, 6C, etc.) may be disposed in ITO layer 712. Overlay 714 is disposed on or above ITO layer 712 and can be made of transparent (e.g., glass or non-glass) material. Overlay 714 is configured to act as the top touch-sensing surface of stackup 700 and/or as the top surface of a touch screen device in which the stackup is disposed.

According to the techniques described herein, ITO layer 706 includes hollow-diamond sensor elements (e.g., with specific structure and dimensions as describe heretofore with respect to FIGS. 3, 6A, 6B, 6C, etc.) that are disposed on one side of substrate 708, while ITO layer 712 includes hollow-diamond sensor elements (e.g., with specific structure and dimensions as describe heretofore with respect to FIGS. 3, 6A, 6B, 6C, etc.) that are disposed on the other side of substrate 708. The sensor elements in both ITO layers 706 and 712 are laminated by OCA adhesives, which allows for better visibility (e.g., no metal bridges) and for better LCD noise tolerance. Further, the sensor elements in both ITO layers 706 and 712 can be made of material with low electrical resistance, which provides maximum flexibility of a tradeoff between sensitivity and visibility—e.g., TX sensor elements in the bottom ITO layer 706 can tolerate more noise and visibility than the RX sensor elements in the top ITO layer 712. Further, in some embodiments the sensor elements in both ITO layers 706 and 712 may be manufactured by using high-resolution etching in order to obtain the benefits of a narrower border on the edges of a touch screen device in which stackup 700 is disposed.

What is claimed is:

1. An apparatus, comprising a mutual capacitance sensing array, the mutual capacitance sensing array comprising a plurality of sensor elements, each sensor element comprising an outer frame including a conductive material, the outer frame forming a single cavity within the interior therein, wherein an area of the cavity is substantially 50% to 90% of an area within an outer boundary of the sensor element, wherein a non-conductive dielectric material is disposed in the cavity, wherein the non-conductive dielectric material is electrically grounded, and wherein the electrical grounding is a floating ground.

2. The apparatus of claim 1, wherein the conductive material is transparent.

3. The apparatus of claim 1, wherein the non-conductive dielectric material is co-planar with the outer frame.

4. The apparatus of claim 1, wherein the non-conductive dielectric material is non-coplanar with the outer frame.

5. The apparatus of claim 1, wherein the outer frame has substantially a diamond shape.

6. The apparatus of claim 1, wherein the plurality of sensor elements comprises transmit (TX) sensor elements and receive (RX) sensor elements that are disposed in a stackup that comprises a substrate, wherein the TX sensor elements are laminated by optically clear adhesive and are disposed on one side of the substrate, and wherein the RX sensor elements are laminated by optically clear adhesive and are disposed on a different side of the substrate than the TX elements.

7. The apparatus of claim 1, further comprising a processing device coupled to the mutual capacitance sensing array, wherein the processing device is operable to detect a presence of a conductive object on the mutual capacitance sensing array.

8. The apparatus of claim 7, wherein the mutual capacitance sensing array is disposed on a touch sensor screen.

9. The apparatus of claim 7, wherein the mutual capacitance sensing array is disposed on a trackpad.

10. A method, comprising:
    forming an outer frame for a plurality of sensor elements, each outer frame comprising a conductive material, each outer frame forming a single cavity within the interior therein, wherein an area of the cavity is substantially 50% to 90% of an area within an outer boundary of the sensor element, wherein a non-conductive dielectric material is disposed in the cavity, wherein the non-conductive dielectric material is electrically grounded, and wherein the electrical grounding is a floating ground; and
    interconnecting the plurality of sensor elements to form a mutual capacitance sensor array.

11. The method of claim 10, wherein the outer frame has substantially a diamond shape.

12. The method of claim 10, further comprising providing a processing device to detect a presence of a conductive object on the mutual capacitance sensing array.

13. The method of claim 12, further comprising disposing the mutual capacitance sensor array on a touch sensor screen.

14. A system, comprising:
    a plurality of capacitive sensor elements configured in an array, each sensor element comprising an outer frame including a conductive material, the outer frame forming a single cavity within the interior therein, wherein an area of the cavity is substantially 50% to 90% of an area within an outer boundary of the sensor element, wherein a non-conductive dielectric material is disposed in the cavity, wherein the non-conductive dielectric material is electrically grounded, and wherein the electrical grounding is a floating ground; and
    a mutual capacitance sensing circuit coupled to the plurality of capacitive sensor elements to detect the presence of a conductive object on the plurality of capacitive sensor elements.

15. The system of claim 14, wherein the plurality of capacitive sensor elements is coupled to a touch screen.

16. The system of claim 14, wherein the plurality of capacitive sensor elements comprises transmit (TX) sensor elements and receive (RX) sensor elements that are disposed in a stackup that comprises a substrate, wherein the TX sensor elements are laminated by optically clear adhesive and are disposed on one side of the substrate, and wherein the RX sensor elements are laminated by optically clear adhesive and are disposed on a different side of the substrate than the TX elements.

* * * * *